US007441713B2

(12) United States Patent
Nguyen et al.

(10) Patent No.: US 7,441,713 B2
(45) **Date of Patent: *Oct. 28, 2008**

(54) TAMPER RESISTANT TEMPERATURE DIAL AND ASSOCIATED METHOD OF USE

(75) Inventors: Can Trong Nguyen, Anaheim, CA (US); Raymond-Paul Joubran, Pasadena, CA (US); Kenneth N. Minkler, Downey, CA (US)

(73) Assignee: Robertshaw Controls Company, Richmond, VA (US)

( * ) Notice: Subject to any disclaimer, the term of this patent is extended or adjusted under 35 U.S.C. 154(b) by 604 days.

This patent is subject to a terminal disclaimer.

(21) Appl. No.: 10/905,248

(22) Filed: Dec. 22, 2004

(65) Prior Publication Data

US 2006/0108431 A1 May 25, 2006

Related U.S. Application Data

(60) Provisional application No. 60/522,936, filed on Nov. 22, 2004.

(51) Int. Cl.
*G05D 23/12* (2006.01)
*H05B 1/02* (2006.01)

(52) U.S. Cl. ....................... 236/1 C; 219/491; 219/507; 219/494; 74/527

(58) Field of Classification Search ......... 292/347-353; 236/1 C; 74/527, 553; 337/320; 219/491, 219/507, 494, 508, 506
See application file for complete search history.

(56) References Cited

U.S. PATENT DOCUMENTS 1,068,961 A 7/1913 Baker
1,104,918 A 7/1914 Mouat
1,473,774 A 11/1923 Leech, Jr.
1,651,038 A 11/1927 Muller
1,673,454 A 6/1928 Hochstein
1,689,236 A 10/1928 Fraser, Jr.
2,253,162 A 8/1941 Ayers
2,953,937 A 9/1960 Jackson et al.
3,203,265 A 8/1965 Flegel
3,537,473 A 11/1970 DeZurik, Jr.

(Continued)

FOREIGN PATENT DOCUMENTS

DE 7137199 U 6/1976

(Continued)

*Primary Examiner*—Chen-Wen Jiang
(74) *Attorney, Agent, or Firm*—Leydig, Voit & Mayer, Ltd.

(57) ABSTRACT

A tamper resistant temperature dial and associated method of use is disclosed. This includes a temperature adjustment device associated with a controller for a heating device that includes a rotatable dial for setting temperature in the heating device, a ring that is operatively attached to the rotatable dial or the controller, wherein the ring includes a plurality of notched portions, and a resilient detent having a first portion engagable with at least one of the plurality of notched portions on the ring, a second portion for releasably applying pressure to the resilient detent for disengaging the first portion of the resilient detent from the at least one of the plurality of notched portions on the ring and having a third portion that is operatively attached to the attached to the controller or the rotatable dial. The heating device can be either electric or gas.

32 Claims, 5 Drawing Sheets

U.S. PATENT DOCUMENTS

| | | | |
|---|---|---|---|
| 3,597,138 | A | 8/1971 | Ray |
| 3,810,064 | A | 5/1974 | Flegel |
| 3,965,529 | A | 6/1976 | Hadzimahalis |
| 4,235,323 | A | 11/1980 | Dykzeul |
| 4,253,690 | A | 3/1981 | Hollander |
| 4,588,851 | A | 5/1986 | Turner |
| 4,635,680 | A | 1/1987 | Fang |
| 4,895,043 | A | 1/1990 | Lee |
| 4,955,253 | A * | 9/1990 | Sakai et al. .................... 74/553 |
| 5,003,803 | A | 4/1991 | Richards |
| 5,230,465 | A | 7/1993 | Kostorz et al. |
| 5,363,720 | A | 11/1994 | Sanchez |
| 5,427,135 | A | 6/1995 | Kieper |
| 5,427,140 | A | 6/1995 | Bosanquet |
| 5,513,831 | A | 5/1996 | Seward |
| 5,590,682 | A | 1/1997 | Fischer |
| 5,647,389 | A | 7/1997 | Holloway |
| 5,950,982 | A | 9/1999 | Williams |
| 6,012,445 | A | 1/2000 | Santelli, Jr. |
| 6,340,148 | B1 | 1/2002 | Sung |
| 6,347,784 | B1 | 2/2002 | Philipps-Liebich et al. |
| 6,375,150 | B1 | 4/2002 | Aguirre-Esponda et al. |
| 6,471,135 | B2 | 10/2002 | Paolucci |
| 6,571,829 | B2 | 6/2003 | Kuriyama et al. |
| 6,617,954 | B2 | 9/2003 | Firestine |
| 6,745,725 | B2 | 6/2004 | Toniolo et al. |

FOREIGN PATENT DOCUMENTS

| | | | |
|---|---|---|---|
| DE | 19952634 | C1 | 8/2001 |
| FR | 887 583 | A | 11/1943 |
| WO | WO 02/06712 | | 1/2002 |

* cited by examiner

TAMPER RESISTANT TEMPERATURE DIAL AND ASSOCIATED METHOD OF USE

CROSS-REFERENCE TO RELATED APPLICATION

This patent application claims priority to U.S. Provisional Patent Application Ser. No. 60/522,936 filed Nov. 22, 2004.

BACKGROUND OF THE INVENTION

The temperature of the water within a water heater is usually maintained and adjusted by a rotatable temperature dial. In the case of a gas-fired water heater, there is a temperature dial that is operatively connected to a gas controller valve that directs the flow of gas to a burner whenever the temperature of the water falls below the set temperature. For an electric water heater, there is a temperature dial that is operatively connected to a thermostat that directs electricity to a heating element whenever the temperature of the water falls below the set temperature.

Excessive water temperature is a hazard in that it may cause scalding at any of the various faucets or appliances serviced by the water heater. Accidental or inadvertent adjustment of the temperature dial can cause water to issue at unexpectedly high temperatures.

The temperature dial is located in a position that is typically easily reached and rotated. If the water heater is located in a readily accessible location, the temperature dial can easily be tampered with or moved by people or things coming into contact with the temperature dial.

Properly securing a water heater from this type of tampering typically results in additional cost and/or inconvenience as to its use. Locking the water heater into an enclosure requires either keys to be kept or a combination to be remembered. An enclosure may also hamper the installation, replacement or servicing of the water heater. Other solutions require a screwdriver or other tool to change the temperature of the temperature dial. An example of this type of device is described in U.S. Pat. No. 6,617,954, which issued on Sep. 9, 2003, which is incorporated herein by reference.

Some of the devices that have previously been developed that are associated directly with a control knob or valve to prevent tampering either involve a substantial additional cost of manufacturing or are very inconvenient to use. These devices can either lock the temperature dial or the gas controller valve/thermostat into place to physically prevent it from being rotated. Other devices serve to decouple the temperature dial and the gas controller valve or the temperature dial and the thermostat from an internal actuation mechanism. In addition to the increased costs in manufacturing, such devices are often difficult to retrofit to existing installations.

Therefore, a significant problem is the inadvertent adjustment of a temperature dial and the lack of a solution that does not involve significant inconvenience or increased manufacturing costs.

The present invention is directed to overcoming one or more of the problems set forth above.

SUMMARY OF INVENTION

The present invention is generally directed to a tamper-resistant temperature dial for a heating device.

In one aspect of this invention, a temperature adjustment device associated with a controller for a heating device is disclosed. This includes a rotatable dial for setting temperature in the heating device, a ring that is operatively attached to the rotatable dial, wherein the ring includes a plurality of notched portions, and a resilient detent, wherein the resilient detent, having a first portion engagable with at least one of the plurality of notched portions on the ring, a second portion for releasably applying pressure to the resilient detent for disengaging the first portion of the resilient detent from the at least one of the plurality of notched portions on the ring and a third portion that is operatively attached to the controller.

In another aspect of this invention, a temperature adjustment device associated with a controller for a heating device is disclosed. This includes a rotatable dial for setting temperature in the heating device, a ring that is operatively attached to the controller, wherein the ring includes a plurality of notched portions, and a resilient detent, having a first portion engagable with at least one of the plurality of notched portions on the ring, a second portion for releasably applying pressure to the resilient detent for disengaging the first portion of the resilient detent from the at least one of the plurality of notched portions on the ring and a third portion that is operatively attached to the rotatable dial.

Yet other aspect of the present invention, a method for adjusting temperature of a controller for a heating device with an adjustment device is disclosed. This method includes applying pressure to a second portion of a resilient detent to disengage a first portion of the resilient detent from at least one of a plurality of notched portions on a ring thereby allowing the rotatable dial for setting temperature in the heating device to rotate to a selected temperature, and removing pressure from the second portion of a resilient detent to engage a first portion of the resilient detent to at the least one of a plurality of notched portions on the ring that is operatively attached to the rotatable dial to position the rotatable dial for the selected temperature.

Still yet other aspect of the present invention, a method for adjusting temperature of a controller for a heating device with an adjustment device is disclosed. This method includes rotating a rotatable dial in a first predetermined direction to lower a temperature in the heating device to a selected lower temperature, applying pressure to a second portion of a resilient detent to disengage a first portion of the resilient detent from at least one of a plurality of notched portions on a ring and rotating the rotatable dial in a second predetermined direction to raise the temperature in the heating device to a selected higher temperature, and removing pressure from the second portion of a resilient detent to engage a first portion of the resilient detent to at the least one of a plurality of notched portions on the ring that is operatively attached to the rotatable dial to position the rotatable dial for the selected temperature.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings.

BRIEF DESCRIPTION OF DRAWINGS

For a better understanding of the present invention, reference may be made to the accompanying drawings in which.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as to obscure the present invention.

Figure 1:
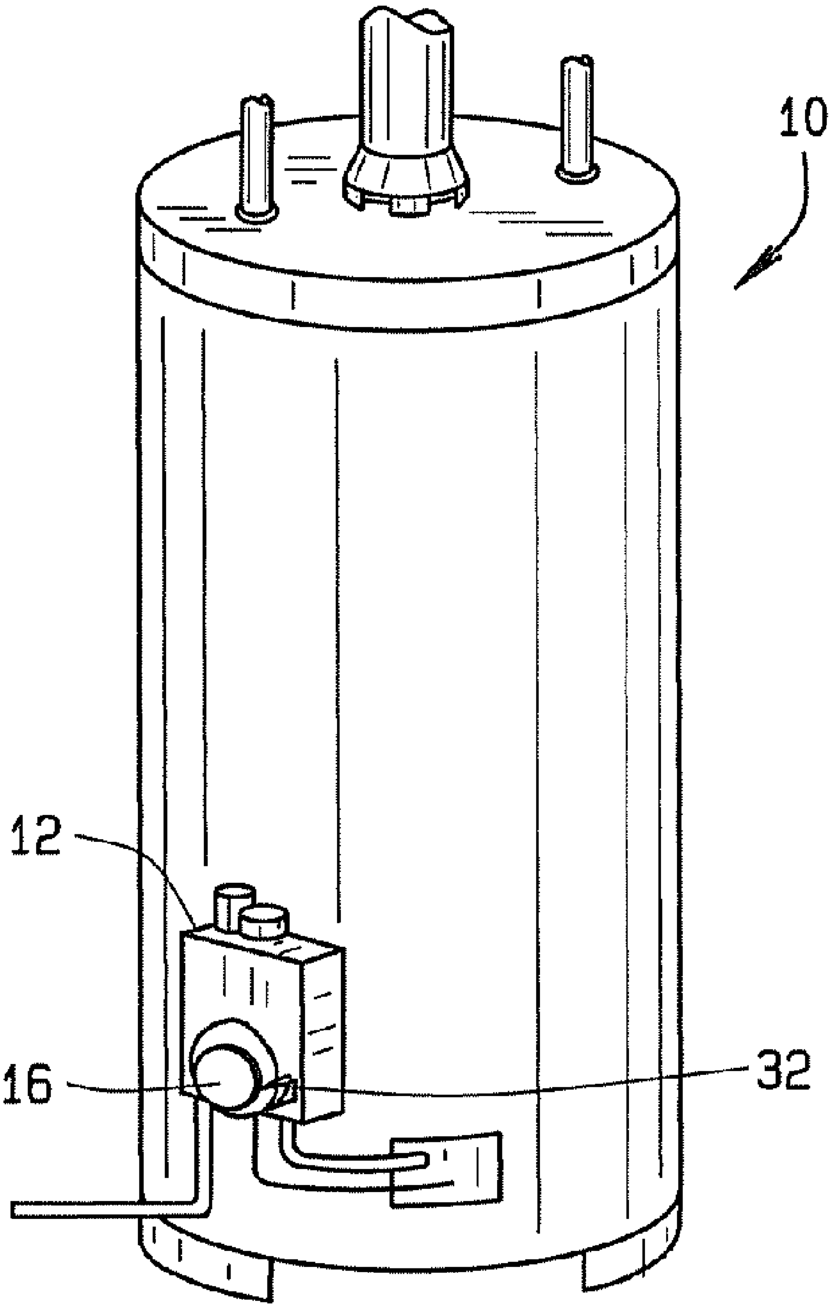
FIG. 1 is a perspective view of a heating device, e.g., water heater, having a tamper resistant temperature dial in accordance with the present invention.

Referring now to the drawings, and initially to FIG. 1, is a perspective view of a heating device 10. An illustrative, but nonlimiting, example of a heating device 10 can include, but is not limited to, a water heater. There is a controller 12 that is attached to the heating device 10. The controller 12 can include, but is not limited to a gas valve controller that regulates the flow of gas to a burner (not shown) or a thermostat that regulates electrical current applied to a heating element (not shown), respectively. If the heating device 10 is a water heater, then the burner is positioned below a water tank (not shown) so as to maintain the water at a selected temperature. The controller 12, e.g., gas controller valve or thermostat, is located on the side of the heating device 10 so that there is easy access to adjust the temperature or adjust the flame of a pilot light. The tamper resistant temperature dial is generally indicated by numeral 16. There is also a resilient detent that is generally indicated by numeral 32.

Figure 2:
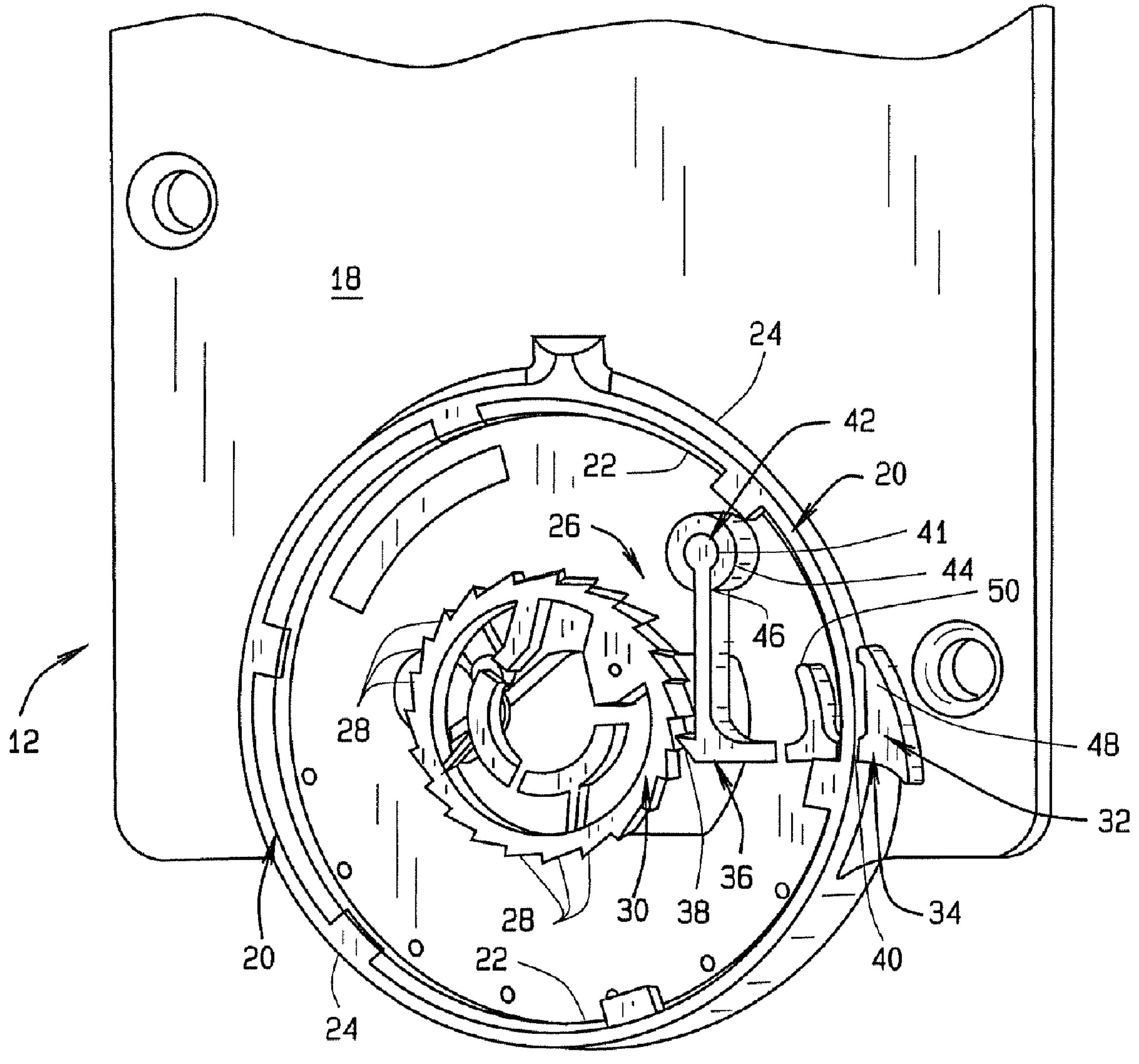
FIG. 2 is an enlarged cut-away frontal view of a controller for a heating device, e.g., water heater, including a ring having a plurality of notched portions and a unengaged resilient detent in accordance with the present invention.
Figure 3:
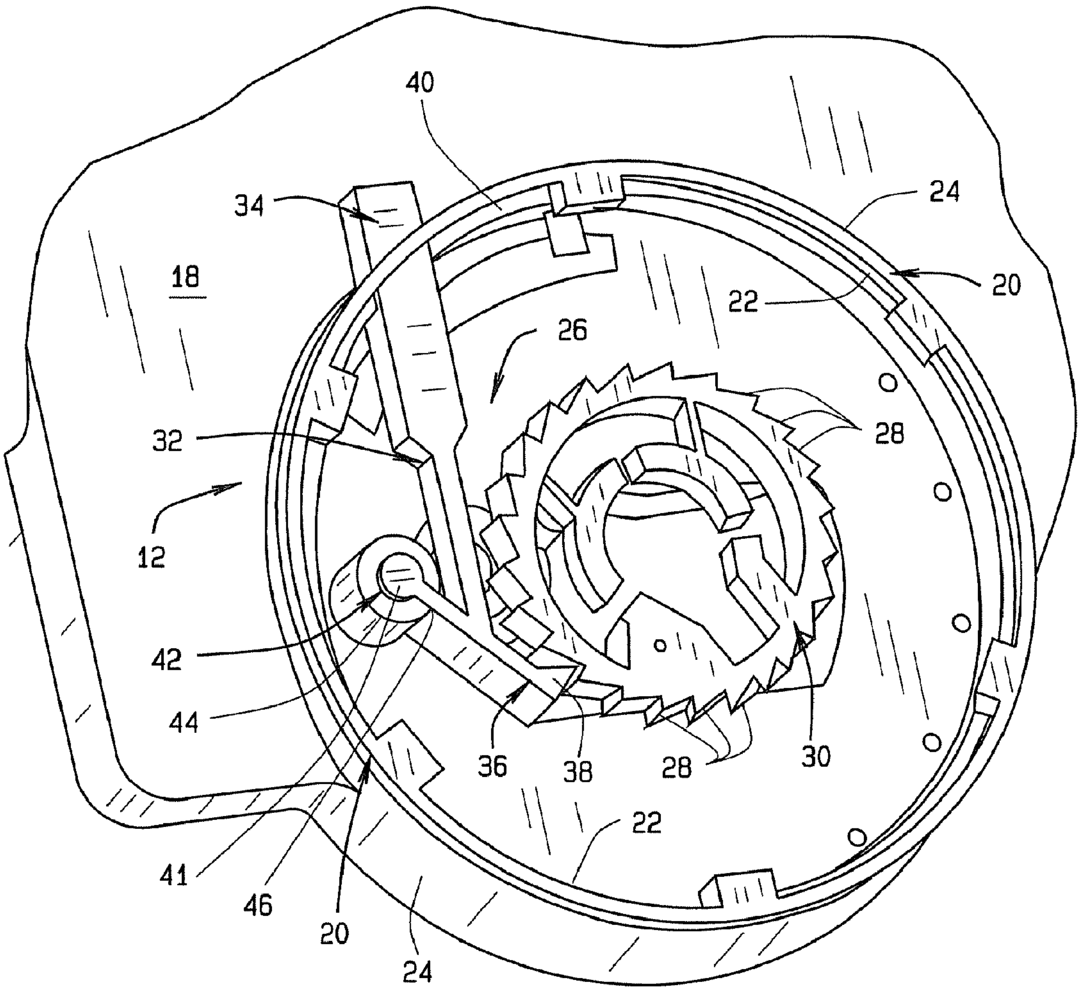
FIG. 3 is an enlarged cut-away frontal view of a controller for a heating device, e.g., water heater, as shown in FIG. 2, including a ring having a plurality of notched portions and an engaged resilient detent in accordance with the present invention.

Referring now to FIGS. 2 and 3, which are enlarged cut-away frontal views of a controller 12 for a heating device 10. There is a cover for the controller 12 that is generally indicated by numeral 18. Positioned on the cover 18 is a circular flange 20 having an inner surface 22 and an outer surface 24.

There is a ratchet that is generally indicated by numeral 26. The ratchet 26 includes a plurality of notched portions indicated by numeral 28 on a ring 30. Preferably, the ring 30 is attached to or integral thereto the tamper resistant temperature dial 16. An illustrative but nonlimiting example of the notched portions 28 includes a series of serrations. The ring 30 is preferably, but not necessarily constructed with a hard material, e.g., metal. However, as an alternative embodiment, the ring 30 may be attached to or integral thereto the cover 18 for the controller 12.

Figure 4:
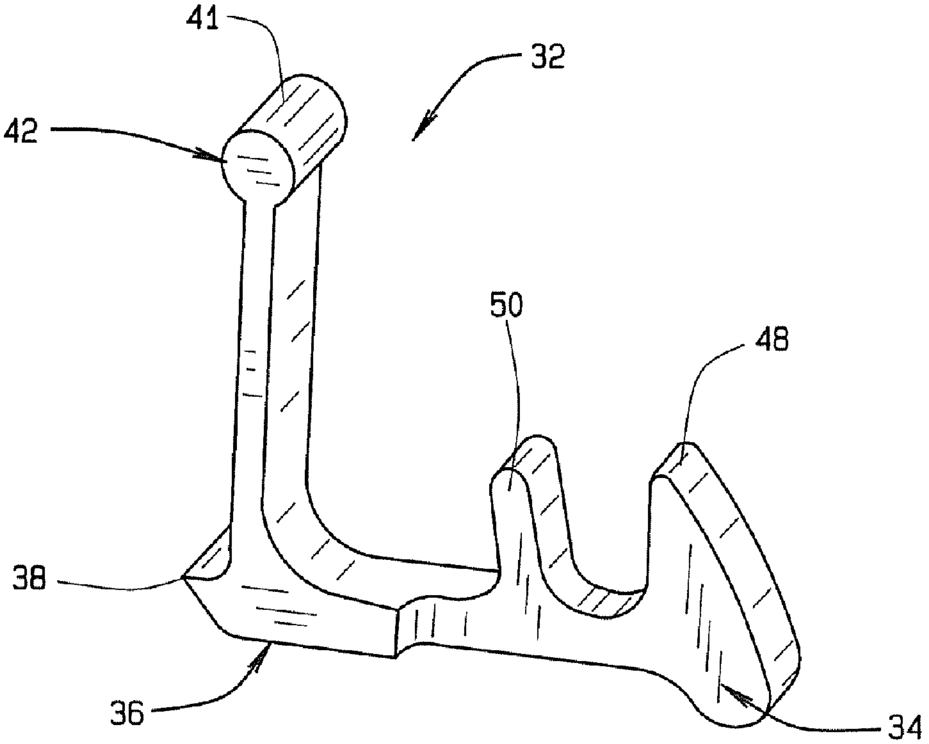
FIG. 4 is a side elevational view of the resilient detent, shown in FIG. 2, in accordance with the present invention.

Referring now to FIGS. 2, 3 and 4, the ratchet 26 also includes a resilient detent 32. The resilient detent 32 includes a first portion 36 and a second portion 34. The first portion 36, can include a leg 38, which is engagable with at least one of the plurality of notched portions 28 on the ring 30. The second portion 34 functions as a lever for manual engagement of the resilient detent 32. There is an opening 40 in the circular flange 20 that allows the second portion 34 of the resilient detent 32 to project through the opening 40 and extend outside the outer surface 24 of the circular flange 20. The resilient detent 32 includes a third portion 42 that is operatively attached to the cover 18 of the controller 12. An illustrative, but nonlimiting, example of this operative attachment includes utilizing a securement member 44 that encloses a securement portion 41 of the third portion 42. In the illustrative, but nonlimiting embodiment, the securement member 44, e.g., cylindrical boss, having an opening 46 and the securement portion 41 is cylindrical and is secured by the securement member 44, e.g., cylindrical boss, with the remainder of the resilient detent 32 extending outward through the opening 46 in the securement member 44. However, a wide variety of shapes and configurations of securement members 44 and securement portions 41 can be utilized.

Referring now to FIGS. 2 and 4, the first portion 34 of the resilient detent 32 includes a first member 48 that is positioned on the outside of the circular flange 20 through opening 40 and adjacent to the outer surface 24 of the circular flange 20. Also, the first portion 34 of the resilient detent 32 includes a second member 50 that is positioned on the inside of the circular flange 20 and positioned before the opening 40 and adjacent to the inner surface 22 of the circular flange 20. The resilient detent 32 can be made from a wide variety of materials with the preferred material being a flexible plastic, e.g., acetal.

Figure 5:
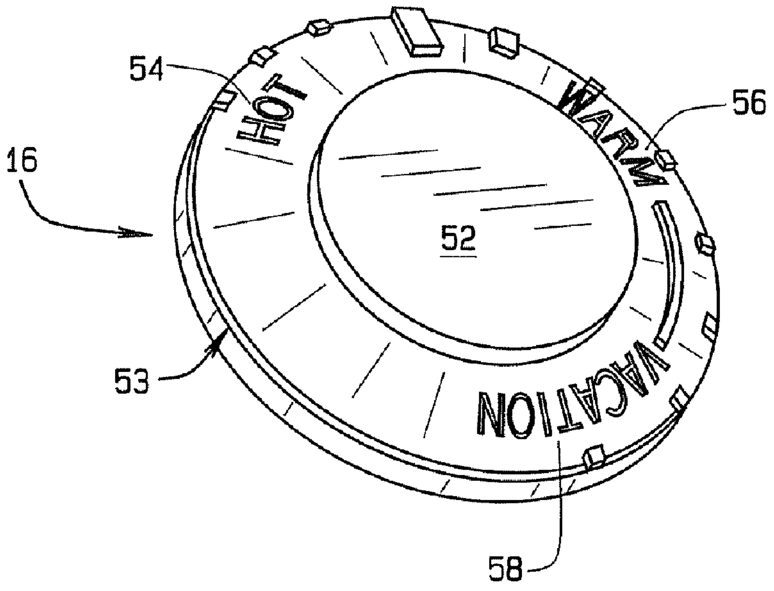
FIG. 5 is a top perspective view of the temperature dial shown in FIG. 1, in accordance with the present invention.

Referring now to FIG. 5, the top of the tamper resistant temperature dial 16 is shown with a top cover 52 with a flanged edge 53. There are temperature indications such as, but not limited to, "hot" 54, "warm" 56 and "vacation" 58. The tamper resistant temperature dial 16 can be made from a wide variety of materials with the preferred material being molded plastic.

Figure 6:
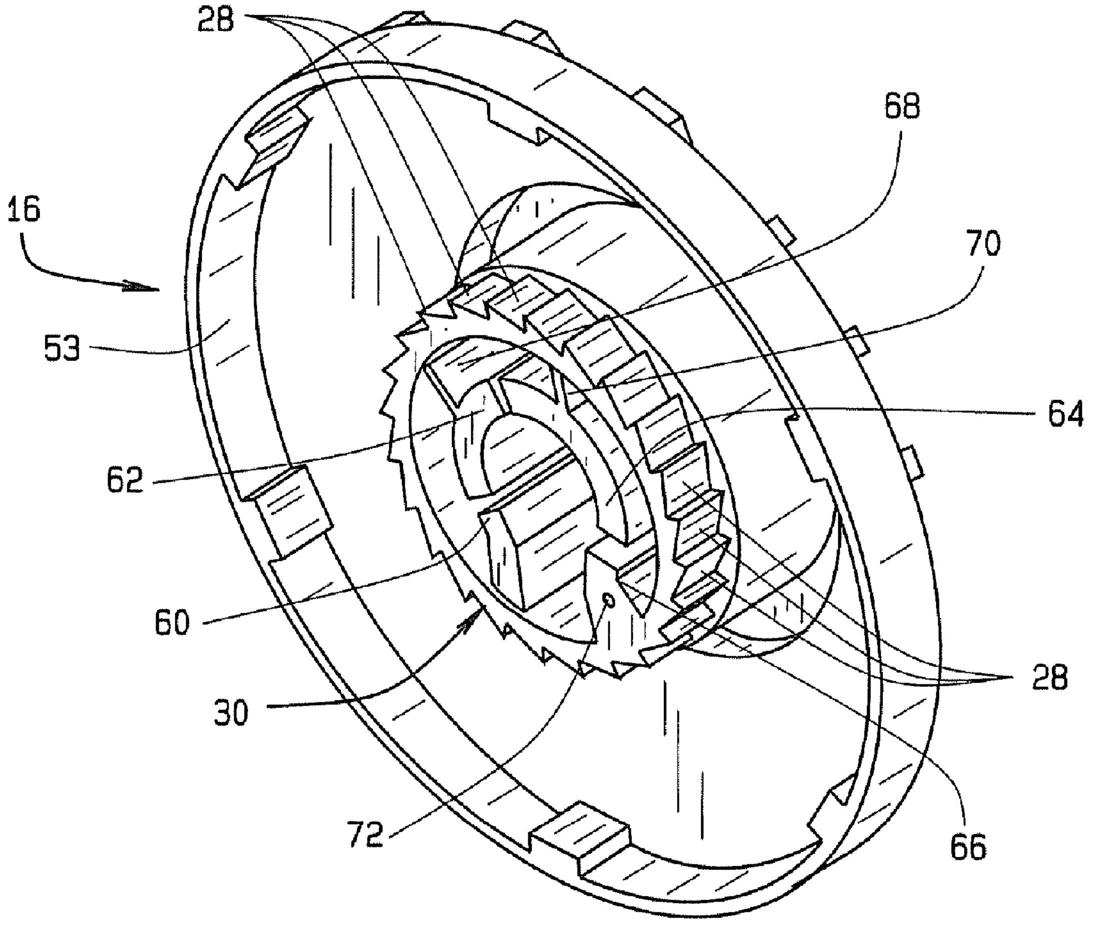
FIG. 6 is a bottom perspective view of the temperature dial shown in FIG. 1, in accordance with the present invention.

Referring now to FIG. 6, the bottom of the tamper resistant temperature dial 16 is shown with the flanged edge 53. The ring 30 having the plurality of notched portions 28 is also shown. Within the ring 30 is a first arcuate segment 60, a second arcuate segment 62, a third arcuate segment 64 and a fourth arcuate segment 66. These segments 60, 62, 64 and 66 are each attached to the ring 30 to secure the rotatable tamper resistant temperature dial 16 to the controller 12. (See FIG. 1.) The first arcuate segment 60 is directly connected to the ring 30. The second arcuate segment 62 is connected to the ring 30 through a first connective member 68 and the third arcuate segment 64 is connected to the ring 30 through a second connective member 70. The fourth arcuate segment 66 is directly connected to the ring 30. There is preferably an opening 72 that can receive a pin (not shown) located on the cover 18 for the controller 12 for the heating device 10. (See FIG. 1.)

The tamper resistant temperature dial 16 allows the set temperature to be selected by rotation in one direction to increase the set temperature and rotation in the opposite direction to decrease the set temperature. As shown in FIG. 1, the tamper resistant temperature dial 16 can be rotated in a counterclockwise direction to turn the water heater down for a cooler temperature. Referring now to FIG. 2, the leg 38 on the first portion 36 of the detent 32 can slide from one notched portion to an adjacent notched portion from the plurality of notched portions 28. It is the turning up of the water heater down for a warmer temperature that cannot occur since the leg 38 on the first portion 36 of the detent 32 will not be able to move from a notched portion of the plurality of notched portions 28 without someone manually applying pressure on the second portion 34 of the detent 32 to remove the leg 38 on the first portion 36 of the detent 32 from the plurality of notched portions 28. The detent 32 moves in relation thereto to the attached third portion 42. When the leg 38 on the first portion 36 of the detent 32 is no longer engaged with the plurality of notched portions 28, tamper resistant temperature dial 16 can be rotated clockwise to the desired higher temperature.

The preferred embodiment of the present invention and the method of using the same has been described in the foregoing specification with considerable detail. It is to be understood that modifications may be made to the invention which do not exceed the scope of the appended claims and modified forms of the present invention performed by others skilled in the art to which the invention pertains will be considered infringements of this invention when those modified forms fall within the claimed scope of this invention.

What is claimed is:

1. A temperature adjustment device associated with a controller for a heating device comprising:

a rotatable dial for setting temperature in the fired heating device;

a ring that is operatively attached to the rotatable dial, wherein the ring includes a plurality of notched portions; and a resilient detent, wherein the resilient detent, having a first portion engagable with at least one of the plurality of notched portions on the ring, a second portion for releasably applying pressure to the resilient detent for disengaging the first portion of the resilient detent from the at least one of the plurality of notched portions on the ring and a third portion that is operatively attached to the controller;

wherein the rotatable dial is cicular and is positioned adjacent to a circular flange located on the controller, the circular flange having inner and outer surfaces, and opening, inside and outside portions, wherein the second portion of the resilient detent extends through the opening in the circular flange so that the resilent detent can be manually moved in relation thereto to disengage the first portion of the resilient dentent from the at least one of the plurality of notched portions of the ring.

2. The temperature adjustment device as set forth in claim 1, wherein the second portion of the resilient detent includes a first member positioned on the outside portion of the circular flange.

3. The temperature adjustment device as set forth in claim 2, wherein the second portion of the resilient detent includes a second member positioned on the inside portion of the circular flange.

4. The temperature adjustment device as set forth in claim 1, wherein the first portion of the resilient detent includes a leg portion for selectively engaging the at least one of the plurality of notched portions on the ring.

5. The temperature adjustment device as set forth in claim 1, wherein the first portion of the resilient detent includes a leg portion for selectively engaging the at least one of the plurality of notched portions on the ring and the second portion of the resilient detent includes a first member positioned on the outside portion of the circular flange and the second portion of the resilient detent includes a second member positioned on the inside portion of the circular flange.

6. The temperature adjustment device as set forth in claim 1, wherein the third portion of the resilient detent includes a securement portion that is operatively secured within a securement member, wherein the securement member has an opening that allows the securement portion of the resilient detent to be secured within and the securement member is attached to the controller to allow the resilient detent to move in relation thereto.

7. The temperature adjustment device as set forth in claim 6, wherein the securement member is a cylindrical boss and the securement portion of the resilient detent is cylindrical.

8. The temperature adjustment device as set forth in claim 1, wherein the controller includes a gas valve controller and the heating device includes a gas-fired heating device.

9. The temperature adjustment device as set forth in claim 8, wherein the gas-fired heating device includes a water heater.

10. The temperature adjustment device as set forth in claim 1, wherein the controller includes a thermostat and the heating device includes an electric heating device.

11. The temperature adjustment device as set forth in claim 10, wherein the electric heating device includes a water heater.

12. A temperature adjustment device associated with a controller for a heating device comprising:

a rotatable dial for setting temperature in the heating device;

a ring that is operatively attached to the controller, wherein the ring includes a plurality of notched portions; and a resilient detent, having a first portion engagable with at least one of the plurality of notched portions on the ring, a second portion for releasably applying pressure to the resilient detent for disengaging the first portion of the resilient detent from the at least one of the plurality of notched portions on the ring and a third portion that is operatively attached to the rotatable dial.

wherein the rotatable dial is circular and is positioned ajacent to a circular flange located on the controller, the circular flange having inner and outer surfaces, an opening, inside and outisde portions, wherein the second portion of the resilient detent extends through the opening in the circular flange so that the resilient detent can be manually moved in relation thereto to disengage the first portion of the reilient detent from the at least one of the plurality of notched portions of the ring.

13. The temperature adjustment device as set forth in claim 12, wherein the second portion of the resilient detent includes a first member positioned on the outside portion of the circular flange.

14. The temperature adjustment device as set forth in claim 13, wherein the second portion of the resilient detent includes a second member positioned on the inside portion of the circular flange.

15. The temperature adjustment device as set forth in claim 12, wherein the first portion of the resilient detent includes a leg portion for selectively engaging the at least one of the plurality of notched portions on the ring.

16. The temperature adjustment device as set forth in claim 12, wherein the first portion of the resilient detent includes a leg portion for selectively engaging the at least one of the plurality of notched portions on the ring and the second portion of the resilient detent includes a first member positioned on the outside portion of the circular flange and the second portion of the resilient detent includes a second member positioned on the inside portion of the circular flange.

17. The temperature adjustment device as set forth in claim 12, wherein the third portion of the resilient detent includes a securement portion that is operatively secured within a securement member, wherein the securement member has an opening that allows the securement portion of the resilient detent to be secured within and the securement member is attached to the rotatable dial to allow the resilient detent to move in relation thereto.

18. The temperature adjustment device as set forth in claim 17, wherein the securement member is a cylindrical boss and the securement portion of the resilient detent is cylindrical.

19. A method for adjusting temperature of a controller for a heating device with an adjustment device comprising:

applying pressure to a second portion of a resilient detent to disengage a first portion of the resilient detent from the at least one of a plurality of notched portions on a ring thereby allowing the rotatable dial for setting temperature in the heating device to rotate to a selected temperature;

removing pressure from the second portion of a resilient detent to engage a first portion of the resilient detent to the at least one of a plurality of notched portions on the ring that is operatively attached to the rotatable dial to position the rotatable dial for the selected temperature; and manually moving the second portion of the resilient detent extending through the opening in a circular flange so that the resilient detent can be manually moved in relation thereto to disengage the first portion of the resilient detent from the at least one of the plurality of notched portions of the ring.

20. The method for adjusting temperature of a controller as set forth in claim 19, wherein the rotatable dial is circular and is positioned adjacent to a circular flange, having an inner surface and an outer surface, wherein the circular flange located on the controller.

21. The method for adjusting temperature of a controller as set forth in claim 19, wherein the first portion of the resilient detent includes a leg portion for selectively engaging the at least one of the plurality of notched portions on the ring and the second portion of the resilient detent includes a first member positioned on the outside portion of the circular flange and the second portion of the resilient detent includes a second member positioned on the inside portion of the circular flange.

22. The method for adjusting temperature of a controller as set forth in claim 19, wherein the ring is operatively connected to the rotatable dial and the resilient detent is operatively connected to the controller.

23. The method for adjusting temperature of a controller as set forth in claim 19, wherein the ring is operatively connected to the controller and the resilient detent is operatively connected to the rotatable dial.

24. The method for adjusting temperature of a controller as set forth in claim 19, wherein the controller includes a gas valve controller and the heating device includes a gas-fired heating device.

25. The method for adjusting temperature of a controller as set forth in claim 24, wherein the gas-fired heating device includes a water heater.

26. The method for adjusting temperature of a controller as set forth in claim 19, wherein the controller includes a thermostat and the heating device includes an electric heating device.

27. The method for adjusting temperature of a controller as set forth in claim 26, wherein the electric heating device includes a water heater.

28. A method for adjusting temperature of a controller for a heating device with an adjustment device comprising:

rotating a rotatable dial in a first predetermined direction to lower a temperature in the heating device to a selected lower temperature;

applying pressure to a second portion of a resilient detent to disengage a first portion of the resilient detent from the at least one of a plurality of notched portions on a ring and rotating the rotatable dial in a second predetermined direction to raise the temperature in the heating device to a selected higher temperature;

removing pressure from the second portion of a resilient detent to engage a first portion of the resilient detent to the at least one of a plurality of notched portions on the ring that is operatively attached to the rotatable dial to position the rotatable dial at the selected higher temperature; and manually moving the second portion of the resilient detent extending through the opening in a circular flange so the at the resilient detent can be manually moved in relation thereto to disengage the first portion of the resilient detent front the at least one of the plurality of notched portions of the ring.

29. The method for adjusting temperature of a controller as set forth in claim 28, wherein the controller includes a gas valve controller and the heating device includes a gas-fired heating device.

30. The method for adjusting temperature of a controller as set forth in claim 29, wherein the gas-fired heating device includes a water heater.

31. The method for adjusting temperature of a controller as set forth in claim 28, wherein the controller includes a thermostat and the heating device includes an electric heating device.

32. The method for adjusting temperature of a controller as set forth in claim 31, wherein the electric heating device includes a water heater.

* * * * *